May 8, 1934.  H. H. ROBINSON  1,957,807
ORIFICE METER FITTING
Filed March 4, 1931   2 Sheets-Sheet 1
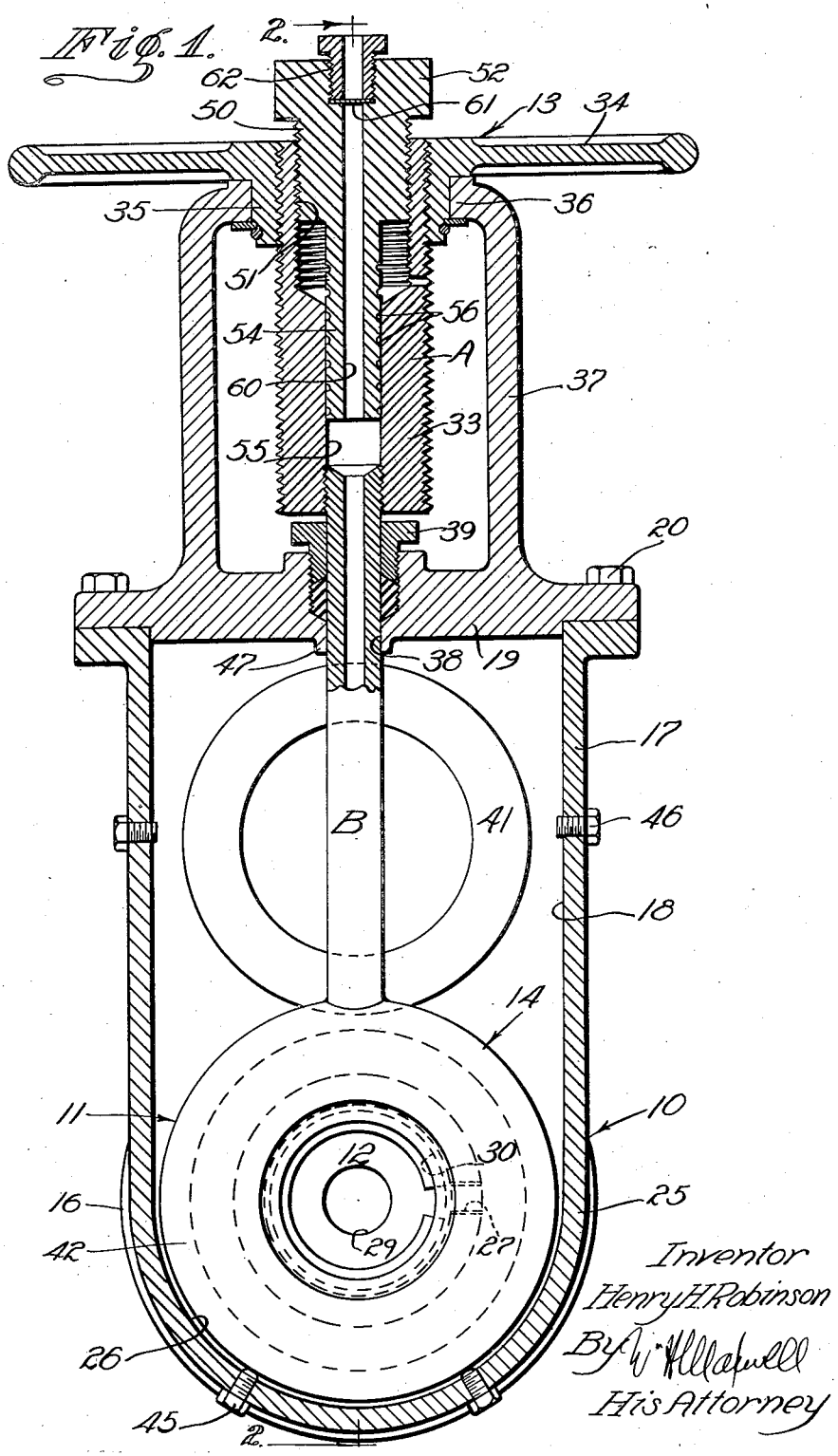
Inventor
Henry H. Robinson
By his Attorney

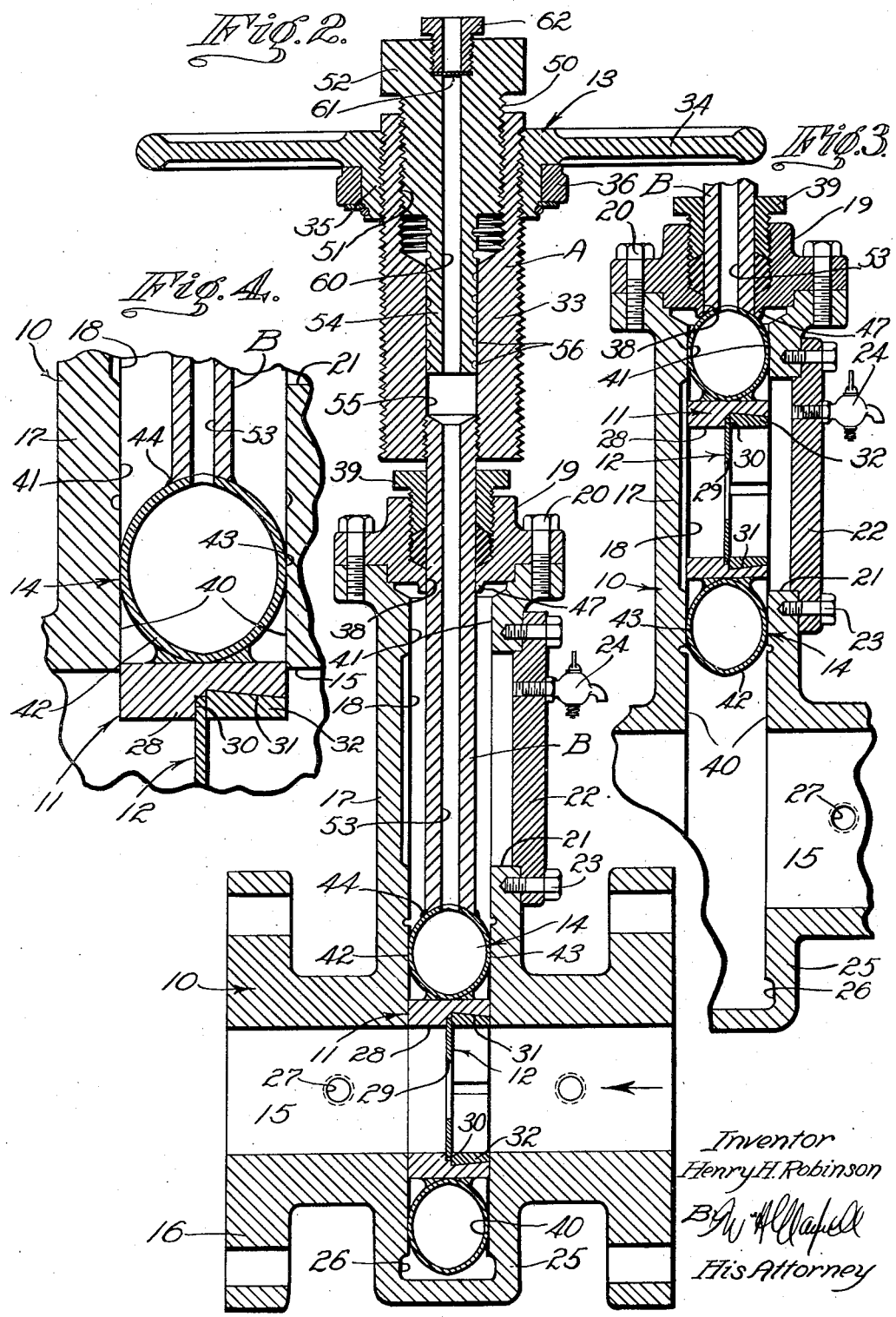

Patented May 8, 1934

1,957,807

UNITED STATES PATENT OFFICE 1,957,807

ORIFICE METER FITTING

Henry H. Robinson, Los Angeles, Calif., assignor to Robinson Orifice Fitting Company, Los Angeles, Calif., a corporation of Nevada Application March 4, 1931, Serial No. 520,097

18 Claims. (Cl. 137—75)

This invention relates to orifice meters for metering the flow of fluid through pipe lines or conduits, and relates more particularly to orifice meter fittings embodying orifice discs for interposition in fluid conduits.

In orifice meter fittings for handling or carrying orifice discs for use in metering the flow of fluid through conduits, it is often necessary to change the orifice discs to compensate for wear or variations in conditions of flow through the conduits. Further, considerable difficulty has been encountered in providing tight and effective fluid seals in orifice fittings.

It is a general object of this invention to provide an improved, simple, and effective orifice meter fitting for handling or carrying orifice discs.

Another object of the invention is to provide an orifice meter fitting of the character mentioned that includes a single shiftable orifice disc carrier operable between a position where the disc is disposed in the conduit opening and a position where the disc is readily accessible for replacement or exchange.

It is another object of the invention to provide an orifice meter fitting of the character mentioned, in which the disc may be easily and quickly replaced without stopping the flow through the conduit and without the leakage of fluid.

Another object of the invention is to provide a device of the character mentioned that embodies a novel and improved means for effecting a tight seal between the orifice disc carrier and the body of the fitting.

It is a further object of the invention to provide an orifice meter fitting of the character mentioned, in which the sealing means includes an annular tubular member adapted to co-operate with opposed seats around the conduit opening, which member is expansible by fluid pressure to tightly seal with the seats.

Another object of this invention is to provide a fitting of the character just mentioned including an opening in the body to pass an orifice plate to and from the annular tubular member and in which there are opposed seats at the opening against which said member can be sealed.

It is a further object of the invention to provide an orifice meter fitting of the character mentioned that embodies simple and effective means for developing and controlling fluid pressure for expanding the hollow annular sealing member.

Other objects and features of the invention will be best and more fully understood from the following detailed description of a typical preferred form of the invention, throughout which description reference is had to the accompanying drawings, in which:

Fig. 1 is a vertical transverse detailed sectional view of the fitting illustrating the carrier in the operative position. Fig. 2 is a vertical detailed sectional view taken as indicated by line 2—2 on Fig. 1. Fig. 3 is a vertical detailed sectional view of the lower portion of the device, illustrating the disc carrier in the up position where the disc is accessible for replacement, and Fig. 4 is an enlarged detailed sectional view of a portion of the device illustrating the sealing member in co-operative engagement with the seats around the conduit opening.

The device provided by the present invention includes, generally, a body 10 adapted to be positioned in a pipe line or conduit, a carrier 11 for carrying an orifice disc 12 and operable between a position where the disc is in the conduit opening and a position where the disc may be accessible for replacement, means 13 for operating the carrier, and means 14 for making a fluid-tight seal between the carrier 11 and the body 10 when the carrier is in either position.

The body 10 is intended to be mounted or interposed in a pipe line and is provided with a longitudinal conduit or opening 15 to register with the opening in the pipe line. The opening 15 is made the same size and shape as the opening of the conduit in which the fitting is connected. Radially projecting flanges 16 may be provided at opposite ends of the body around the opening 15 for connection with corresponding flanges or flange fittings on the conduit or pipe line.

In accordance with the invention, the body 10 is provided with a laterally projecting extension or housing 17. The housing 17 may be formed integral with the body 10 and is provided with a central longitudinal or vertical opening 18 for passing the carrier 11. The longitudinal axis of the opening 18 is preferably normal to the axis of the conduit opening 15, and the opening 18 may have flat, parallel side walls, as illustrated in the drawings. The upper or outer end of the opening 18 may be closed by a flanged head 19. The head 19 may be detachably mounted on the housing by bolts or screws 20. A round opening 21 is provided in one side wall of the housing 17. The opening 21 is in the nature of a hand hole, through which the carrier 11 and disc 12 are readily accessible when the carrier is in the up or out position. The hand hole 21 is sufficiently large to pass the disc 12 with considerable clearance and is normally closed by a cover plate 22. The plate 22 may be held in position to cover the opening 21 by screws or bolts 23.

A pet cock or relief valve 24 may be provided in the plate 22 to relieve pressure from the inner side of the plate when the disc 12 is to be removed, as will be hereinafter described.

The body 10 is provided between the end flanges 16 with a circumferential enlargement 25 in radial alignment with the housing 17. The circumferential enlargement 25 is internally relieved or hollow to provide an annular recess 26 in the walls of the conduit opening 15. The upper part of the recess 26 joins or communicates with the lower end of the opening 18. The opening 18 and circular recess 26 constitute a chamber intersecting the fluid or conduit opening 15. Openings 27 may be provided in the walls of the body 10 to communicate with the passage or conduit opening 15 at opposite sides of the recess 26 to receive pipes connecting with an instrument (not shown) for indicating or recording difference in pressure at the two points in the body.

The carrier 11 is provided to support or carry an orifice disc and is operable in the body between a position in the recess 26, where it holds the disc across the conduit opening 15, and a position in the opening 15 where the disc may be accessible through the opening 21. The carrier 11 may be a simple annular member or ring having an outside diameter somewhat greater than the diameter of the opening 15, so that it may be supported by the walls of the recess 26. The opening 28 in the ring or carrier 11 is provided to carry the orifice disc 12.

The disc 12 may be a comparatively thin disc or circular plate having a central opening or orifice 29 for passing fluid. In accordance with the broader aspects of the invention, various types of orifice discs may be used in conjunction with the invention and may be removably secured in the opening 28 of the carrier in any suitable manner. In the particular case illustrated in the drawings, an annular shoulder or seat 30 is provided in the walls of the opening 28 to carry the orifice disc 12. One end portion 31 of the opening 28 may be of enlarged diameter and may have outwardly convergent walls. A split flexible ring 32 may be arranged in the enlarged portion 31 of the opening to removably retain the orifice disc 12 in position. The periphery of the ring 32 may be outwardly convergent to fit the convergent walls of the opening 31. The inner end of the ring 32 fits against the disc 12 and retains it in position on the seat 30. The fitting is preferably positioned in a pipe line or conduit so that the flow of fluid through the opening 15 is in the direction indicated by the arrow in Fig. 2 of the drawings.

The means 13 for operating or moving the disc carrier 11 through the body is in the nature of a screw means and includes a stem 33 having an enlarged outer end part or head A and a reduced inner end part B extending into the opening 18 and connected with the carrier 11. The part A of the stem is externally screw-threaded and co-operates with or is actuated by a hand wheel 34. The hand wheel 34 may include a central hub or nut 35 for co-operating with the part A of the stem. The nut 35 of the hand wheel may be rotatably supported on a cross head 36 carried on the upper ends of the spaced arms 37. The arms 37 project upwardly from the head 19 at opposite sides of the stem 33 The threads of the part A of the stem and of the nut 35 may be comparatively coarse and steep so that the disc carrier 11 may be quickly operated.

The lower reduced end B of the stem extends through a central opening 38 in the head 19 to project into the opening 18. A suitable packing gland 39 may be provided in the opening 38 to seal about the inner end B of the stem. The lower end of the part B of the stem is operatively connected with the disc carrier 11 through the sealing member of the means 14, as will be hereinafter described.

The sealing means 14 is operable to make an effective seal between the disc carrier 11 and the body 10 when the carrier 11 is in the operative position where the disc is in the opening 15 and also when the carrier is in position at the opening 21. The packing or sealing means 14 includes, generally, a set or pair of opposed seats 40 around the conduit opening 15, a pair of opposed seats 41 in the opening 18 at the hand hole 21, a sealing member 42 for co-operating with the seats 40 and 41, and means for expanding the member 42 to effectively seal with the seats.

The seats 40 are provided on the opposite side walls of the recess 26 and are annular, extending completely around the fluid passage 15. The seats 40 are preferably flat and parallel and may be ground or otherwise surfaced to effectively co-operate with the sealing member 42. In the preferred form of the invention, the seats 40 are normal to the longitudinal axis of the opening 15, and extend inwardly to join the walls of the opening. The upper or outer set of seats 41 are similar to the seats 40, being of the same diameter and being spaced the same distance apart. The seats 41 are provided directly opposite one another on the opposite side walls of the opening 18. One of the seats 41 is provided at and extends completely around the inner end of the hand opening 21. The seats 40 and 41 may be provided or formed on projections or bosses provided on the walls of the recess 26 and opening 18.

The sealing member 42 is an annular expansible part carried on the carrier 11. The sealing member 42 is hollow or tubular and surrounds the exterior of the carrier 11. In the preferred embodiment of the invention, the expansible sealing member 42 is formed of a suitable resilient metal and is provided with rather thin walls so as to readily expand when subjected to internal pressure. The sealing tube 42 may be rigidly secured to the carrier 11 in any suitable manner, for example, it may be welded to the carrier. The tubular sealing member 42 is proportioned to have a sliding and sealing fit with the seats 40 and 41 when in the normal or unexpanded state. In the particular form of the invention illustrated in the drawings, the hollow tubular member 42 is elliptical in cross section. The member is preferably related to the carrier 11 to have its major axis radial relative to the carrier 11. The sealing member 42 may be provided at diametrically opposite points with flat annular sealing faces 43 for co-operating with the seats 40 and 41. The sealing surfaces 43 may be ground or otherwise finished smoothly to effectively co-operate with the seats in the body.

The lower end of the reduced part B of the stem 33 is attached to the sealing member 42 to be operatively connected with the disc carrier 11. The reduced portion B of the stem may be attached to the sealing member 42 in any suitable manner, for example, it may be welded to the member, as illustrated at 44 in the drawings.

The invention provides means for limiting movement of the assembly of the carrier and sealing member 42 and for properly centering the sealing member on the seats 40 and 41. Stop screws 45 may be threaded through openings in the circumferential part 25 of the body to project inward from the bottom of the recess 26. The screws 45 are adapted to limit the inward or downward movement of the sealing member 42 and to stop the sealing member at a point where it is centered between the spaced seats 40. Guide or stop screws 46 may be threaded through openings in the end walls of the housing 17 at points diametric of the opening 21 to center the sealing member 42 between the seats 41 when the carrier is in the up or out position. The screws 46 operate to hold the sealing member against lateral movement when in position on the seats 41. An annular stop 47 may be provided on the lower side of the head around the opening 30 to limit the upward movement of the sealing member through the opening 18.

The means for expanding the sealing member 42 is in the nature of an hydraulic or fluid pressure means and may be manually controllable. In the specific embodiment of the invention illustrated in the drawings, the fluid pressure means for expanding the sealing member 42 includes a gland or compression member 50 screw-threaded into a longitudinal opening 51 in the head A of the stem. The opening 51 may be of comparatively large diameter and extends inwardly or downwardly from the outer end of the head A. The member 50 may have a polygonal enlargement 52 at its upper end projecting above the head A to facilitate its operation. An opening or passage 53 extends longitudinally through the reduced portion B of the stem to the interior of the sealing member 42. A plunger 54 of reduced diameter may be provided on the lower end of the member 50 to operate in a cylinder opening 55 connecting the opening 51 and passage 53. The plunger 54 may be provided with labyrinth sealing means in the form of a plurality of spaced grooves 56 in its exterior.

The passage 53 may be of considerably less diameter than the opening 55. The opening 55, the passage 53, and the interior of the sealing member 42 may be filled with or may carry a suitable liquid, such as grease, or the like.

The plunger 54 provides a pressural advantage whereby a maximum internal fluid pressure may be exerted on the sealing member 42 by a minimum force applied to the compression member 50. It will be readily apparent how screwing or threading of the member 50 into the opening 51 causes pressure within the sealing member 42 so that it is expanded to effectively co-operate with the seats in the body.

The present invention provides a relief or safety means in connection with the means for expanding the sealing member 42 that prevents the sealing member from being subjected to an excessive internal pressure. A longitudinal passage 60 extends through the member 50 and plunger 54. The lower end of the passage 60 communicates with the cylinder opening 55, while the upper end of the passage 60 is closed by a frangible sealing disc 61. The sealing or closure disc 61 may be retained in position across the passage 60 by a tubular nut 62 threaded into the upper end of the passage. The closure disc 61 is designed to burst or fail at a predetermined high pressure that might be dangerous or injurious to the tubular sealing member 42.

It is believed that the practicability and utility of the orifice meter fitting provided by the present invention will be readily apparent from the foregoing detailed description. When the device is in operation, the carrier 11 is positioned as illustrated in Figs. 1, 2, and 4 of the drawings where the disc 12 extends across the conduit passage 15 to restrict the flow of fluid therethrough. When the parts are in this position, the sealing member 42 cooperates with the opposed annular seats 40 around the passage 15 to prevent the leakage of fluid outwardly through the housing 17 and between the separated parts of the passage 15. It will be apparent how the sealing member 42 may be expanded to tightly seal with the seats 40 by screwing or advancing the member 50 into the opening 51. Due to the elliptical cross sectional configuration of the member 42, it has a decided tendency to expand axially in opposite directions to co-operate with the seats 40. The sealing surfaces 43 of the member 42 have a sliding fit with the seats 40 when the tubular member is in its normal unexpanded state, so that a seal is provided between the sealing member 42 and the seats prior to the expansion of the sealing member. Upon threading of the member 50 downwardly through the opening 51, the sealing tube 42 is expanded by internal pressure so that the sealing surfaces 43 are more tightly pressed against the closing seats 40. When the disc carrier 11 is in the normal operative position, it is held between the opposed seats 40 and, through its engagement with these seats, the tubular sealing member 42 is relieved of pressures or strains that would otherwise come upon it.

When it is desired to replace or exchange an orifice disc 12, the fluid pressure may be relieved wholly or partially from the hollow sealing member 42 by threading the member 50 outward in the opening 51. The carrier 11 may then be operated outwardly through the opening 18 by turning the hand wheel 34 in a direction to cause outward movement of the stem 33. The upper end of the sealing member 42 may engage the stop 47 on the head to limit outward movement of the stem and carrier. Upon the carrier reaching this position, the member 50 may be threaded into the opening 51 to expand the sealing tube 42 into effective co-operative engagement with the outer seats 41. This provides an effective fluid seal between the carrier 11 and the housing 17 so that there is no danger of passage of fluid outwardly through the hand opening 21. Pressure may be relieved from the opening 18 by opening the relief valve 24. The hand hole cover 22 may then be removed to make the carrier and the sealing disc accessible. The sealing disc 12 may be easily removed by compressing the split ring 32 and removing it from the opening 31. When the orifice disc has been replaced, the cover plate 22 may be again positioned over the opening 21. The internal pressure in the sealing member 32 may be relieved by outward threading of the part 50 and the hand wheel 34 may be operated to shift the carrier 11 downwardly or inwardly to its normal operative position illustrated in Figs. 1, 2, and 4 of the drawings. An expanding pressure may again be put on the sealing member 42 by means of the screw-threaded member 50 so that it provides an effective seal between the carrier 11 and the body 10. During shifting of the carrier 11 through the opening 18 and recess 26, the carrier and the sealing member 42 have sliding engagement with the seats 40 and 41 to be properly guided through the openings. The invention provides an orifice meter fitting that is compact and that is inexpensive of manufacture. The orifice discs may be easily and quickly replaced without removing the fluid pressure from the conduit opening 15, as the sealing member 42 provides a means for preventing leakage of fluid at all times.

Having described only a typical preferred form of the invention, I do not wish to limit myself to the specific details set forth, but wish to reserve to myself any changes or variations that may appear to those skilled in the art or fall within the scope of the following claims:

Having described my invention, I claim:

1. A device of the character described including, a body having a fluid passage, an expansible member for supporting an orifice disc across the passage and for sealing with the body around the passage, and screw means for operating the member into and out of position at the passage.

2. A device of the character described including, a body having a fluid passage, a seat in the body around the passage, an annular expansible member for sealing with the seat and for supporting an orifice disc across the passage, and screw means for operating the member into and out of position at the seat.

3. An orifice meter fitting including, a body having a fluid passage, spaced seats in the body around the passage, a tubular expansible member for co-operating with the seats and adapted to support an orifice disc across the passage, a threaded stem for operating the member into and out of position between the seats, and means on the stem for expanding the member, said means including a plunger operable in a fluid passage in the stem communicating with the interior of the member.

4. An orifice meter fitting including, a body having a fluid passage and an opening spaced from the passage, seats in the body around the passage and opening, a sealing member adapted to co-operate with the seats and operable to support an orifice disc across the passage when engaging the seats at the passage, and screw means for operating the member between a position at the passage and a position at the opening.

5. An orifice meter fitting including, a body having a fluid passage and an opening spaced from the passage, seats in the body around the passage and opening, a tubular expansible sealing member operable to seal with the seats and adapted to support an orifice disc across the passage when sealing with the seat at the passage, a screw-threaded stem for operating the member between the seats, and fluid pressure means carried by the stem for expanding the member.

6. An orifice meter fitting including, a body having a fluid passage and an opening spaced from the passage, spaced seats around the passage, and spaced seats in the body at the opening, a hollow annular sealing member adapted to co-operate with the seats, a screw stem for operating the member between the two sets of seats, and means carried by the stem for expanding the member into tight sealing engagement with the seats.

7. An orifice meter fitting including, a body having a fluid passage and an opening spaced from the passage, spaced seats around the passage, and spaced seats in the body at the opening, a hollow annular sealing member adapted to co-operate with the seats, a screw stem for operating the member between the two sets of seats, and means carried by the stem for expanding the member into tight sealing engagement with the seats, said means including a plunger operable in an opening in the stem communicating with the interior of the sealing member.

8. An orifice meter fitting including, a body having a fluid passage and a service opening spaced from the passage, a seat on the interior of the body around the passage, a seat on the interior of the body around the opening, a shiftable orifice disc carrier for holding an orifice disc across the passage, a hollow expansible sealing member on the carrier for co-operating with the seats, a longitudinally movable stem connected with the member for moving the member between a position at the first mentioned seat and a position at the second mentioned seat, and means for expanding the member.

9. An orifice meter fitting including, a body having a fluid passage and an opening removed from the passage, seats in the body around the passage and at the opening, an orifice disc carrier, a threaded stem for operating the carrier between a position where it holds an orifice disc across the passage and a position where it holds the disc at the opening, and an expansible sealing member on the carrier for co-operating with the seats.

10. An orifice meter fitting including, a body having a fluid passage and an opening removed from the passage, spaced seats in the body around the passage and at the opening, an orifice disc carrier, screw means for operating the carrier between a position where it holds an orifice disc across the passage and a position where it holds the disc at the opening, an expansible sealing member on the carrier for co-operating with the said seats, and fluid pressure means on the screw means for expanding the member.

11. An orifice meter fitting including, a body having a fluid passage and an opening removed from the passage, seats in the body around the passage and at the opening, an orifice disc carrier operable between a position where it holds an orifice disc carrier operable between a position where it holds an orifice disc across the passage and a position where it holds the disc at the opening, a screw-threaded stem for operating the disc between said positions, a tubular expansible sealing member on the carrier for co-operating with the seats, and means on the stem for expanding the sealing member.

12. An orifice meter fitting including, a body having a fluid passage, an extension on the body having a chamber communicating with the passage and having a hand opening, spaced annular seats in the body around the passage, spaced annular seats in the extension at the opening, an annular tubular expansible sealing member shiftable from a position between the seats at the passage and a position between the seats at the opening, a threaded stem for operating the sealing member between said positions, and fluid pressure means carried by the stem for expanding said member to seal with the seats.

13. An orifice meter fitting including, a body having a fluid passage, an extension on the body having a chamber communicating with the passage and having a hand opening, spaced annular seats in the body around the passage, spaced annular seats in the extension at the opening, an annular tubular expansible sealing member shiftable from a position between the seats at the passage and a position between the seats at the opening, means for removably mounting an orifice disc in the sealing member, a screw actuated stem for operating the sealing member between said positions, and fluid pressure means carried by the stem for expanding said member to seal with the seats.

14. An orifice meter fitting including, a body having a fluid passage and an opening spaced from the passage, spaced seats around the passage, and spaced seats in the body at the opening, a hollow annular sealing member adapted to cooperate with the seats, a screw stem for operating the member between the two sets of seats, and means carried by the stem for expanding the member into tight sealing engagement with the seats, the member being of elliptical cross section.

15. An orifice meter fitting including, a body having a fluid passage, and an opening spaced from the passage, spaced annular seats in the body around the passage, spaced annular seats in the body at the opening, an annular tubular expansible sealing member, means for removably mounting an orifice disc in the sealing member, a screw-threaded stem for operating the sealing member between positions between the sets of spaced seats, and a plunger operable in an opening in the stem communicating with the interior of the member for expanding the member.

16. An orifice meter fitting including, a body having a fluid passage, and an opening spaced from the passage, spaced annular seats in the body around the passage, spaced annular seats in the body at the opening, an annular tubular expansible sealing member, means for removably mounting an orifice disc in the sealing member, a screw-threaded stem for operating the sealing member between positions between the sets of spaced seats, and a screw-threaded plunger operable in an opening in the stem communicating with the interior of the member for expanding the member.

17. An orifice meter fitting including, a body having a fluid passage, and an opening spaced from the passage, spaced annular seats in the body around the passage, spaced annular seats in the body at the opening, an annular tubular expansible sealing member, means for removably mounting an orifice disc in the sealing member, a screw-threaded stem for operating the sealing member between positions between the sets of spaced seats, a plunger operable in an opening in the stem communicating with the interior of the member for expanding the member, and a frangible safety closure closing a port in communication with the opening in the stem.

18. A device of the character described including, a body having a fluid passage, a rigid orifice disc carrier operable between a position at the fluid passage and a position removed from the passage, an expansible member rigidly associated with the orifice disc carrier for sealing with the body around the fluid passage, and screw means for operating the carrier between said positions.

HENRY H. ROBINSON.